(12) United States Patent
Morifuji et al.

(10) Patent No.: US 8,565,516 B2
(45) Date of Patent: Oct. 22, 2013

(54) IMAGE PROCESSING APPARATUS, IMAGE PROCESSING METHOD, AND PROGRAM

(75) Inventors: Takafumi Morifuji, Tokyo (JP); Kuniaki Takahashi, Tokyo (JP); Don Eklund, Yorba Linda, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 567 days.

(21) Appl. No.: 12/871,525

(22) Filed: Aug. 30, 2010

(65) Prior Publication Data

US 2011/0194756 A1    Aug. 11, 2011

Related U.S. Application Data

(60) Provisional application No. 61/301,682, filed on Feb. 5, 2010.

(51) Int. Cl.
*G06K 9/00* (2006.01)
(52) U.S. Cl.
USPC .............................. 382/154; 345/419; 348/42
(58) Field of Classification Search
USPC ................. 382/154; 345/419–427; 348/42–60
See application file for complete search history.

(56) References Cited

U.S. PATENT DOCUMENTS

2011/0134212 A1 * 6/2011 Neuman et al. .................. 348/42
2012/0242791 A1 * 9/2012 Saito ............................... 348/43

FOREIGN PATENT DOCUMENTS

JP     10-327430     12/1998
JP     2006-114023    4/2006

* cited by examiner

*Primary Examiner* — Aaron W Carter
(74) *Attorney, Agent, or Firm* — Finnegan, Henderson, Farabow, Garrett & Dunner, L.L.P.

(57) ABSTRACT

An image processor includes a main image statistical information generator that detects a parallax of each predetermined unit of a 3D main image from main image data and generates parallax statistical information, a sub-image statistical information generator unit that detects a parallax of each predetermined unit of a 3D sub-image from sub-image data and generates parallax statistical information, a parallax controller that computes, using the statistical information, a correction amount used for correcting at least one of the main image and sub-image parallaxes so that a positional distance between the main image and the sub-image in a depth direction is within a predetermined range, a converter that converts at least one of the main image data and sub-image data so that at least one of the parallaxes of the images is corrected by the correction amount, and a superimposing unit that superimposes the sub-image data on the main image data.

10 Claims, 9 Drawing Sheets

HISTOGRAM OF PARALLAXES
(IN THE CASE OF SIMPLE
SUPERIMPOSITION)

IMAGE PROCESSING APPARATUS, IMAGE PROCESSING METHOD, AND PROGRAM

CROSS REFERENCE TO RELATED APPLICATION

This application is a non-provisional application claiming benefit of U.S. Provisional Application No. 61/301,682, filed Feb. 5, 2010, the content of which is incorporated herein by reference in its entirety.

BACKGROUND OF THE INVENTION

1. Field of the Invention

The present invention relates to an image processing apparatus, an image processing method, and a program, and more specifically, it relates to an image processing apparatus, an image processing method, and a program capable of reducing eye fatigue of a user when a plurality of 3D images are combined and displayed.

2. Description of the Related Art

In general, certain content, such as a movie, is in the form of a 2D image. Recently, 3D images have attracted attention.

One type of reproduction apparatus for reproducing 3D content is an apparatus that displays a main image, such as a 3D movie, and a different 3D image combined with the main image as a sub-image. Such a reproduction apparatus, for example, performs picture-in-picture display in which a 3D main image is displayed on a parent screen and the 3D sub-image is displayed in a child screen, OSD display in which an OSD (On Screen Display) image representing a 3D sub-image is combined with a 3D main image and is displayed, or a caption display in which a caption image representing a 3D sub-image is combined with a 3D main image.

In addition, in some cases, a ticker is combined with a 3D main image and is displayed (refer to, for example, Japanese Unexamined Patent Application Publication No. 10-327430).

SUMMARY OF THE INVENTION

As described above, when a reproduction apparatus combines a 3D sub-image with a 3D main image and displays the combined image, the position of the 3D main image in a depth direction which is perpendicular to the screen of the 3D main image may be positioned too far away from or too close to the position of the sub-image in a depth direction. Accordingly, the user may suffer from eye fatigue.

Accordingly, the present invention provides an image processing apparatus, an image processing method, and a program that reduce eye fatigue of the user when a plurality of 3D images are combined and displayed.

According to an embodiment of the present invention, an image processing apparatus includes main image statistical information generating means for detecting a parallax of each of predetermined units of a 3D main image on the basis of main image data representing image data of the main image and generating main image statistical information representing statistical information regarding the parallax, sub-image statistical information generating means for detecting a parallax of each of predetermined units of a 3D sub-image on the basis of sub-image data representing image data of the sub-image and generating sub-image statistical information representing statistical information regarding the parallax, parallax control means for computing, on the basis of the main image statistical information and the sub-image statistical information, an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range, image conversion means for converting at least one of the main image data and the sub-image data so that at least one of the parallax of the main image and the parallax of the sub-image is corrected by the amount of correction and outputting the image data, and superimposing means for superimposing the sub-image data output from the image conversion means on the main image data output from the image conversion means.

According to other embodiments of the present invention, an image processing method and a program are provided. The image processing method and a program correspond to the above-described image processing apparatus.

According to the embodiment of the present invention, a parallax of each of predetermined units of a 3D main image is detected on the basis of main image data representing image data of the main image, and main image statistical information representing statistical information regarding the parallax is generated. A parallax of each of predetermined units of a 3D sub-image is detected on the basis of sub-image data representing image data of the sub-image, and sub-image statistical information representing statistical information regarding the parallax is generated. An amount of correction used for correcting at least one of the parallax of the main image and the parallax of the sub-image is computed on the basis of the main image statistical information and the sub-image statistical information so that a distance between the position of the main image and the position of the sub-image in a depth direction representing a direction perpendicular to a screen of the main image and the sub-image is within a predetermined range. At least one of the main image data and the sub-image data is converted so that at least one of the parallax of the main image and the parallax of the sub-image is corrected by the amount of correction and is output, and the sub-image data is superimposed on the main image data.

According to still another embodiment of the present invention, a reproduction apparatus includes read-out means for reading out main image data representing image data of a 3D main image and sub-image data representing image data of a 3D sub-image, main image statistical information generating means for detecting a parallax of each of predetermined units of the main image on the basis of the main image data and generating main image statistical information representing statistical information regarding the parallax, sub-image statistical information generating means for detecting a parallax of each of predetermined units of the sub-image on the basis of the sub-image data and generating sub-image statistical information representing statistical information regarding the parallax, parallax control means for computing an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range on the basis of the main image statistical information and the sub-image statistical information, image conversion means for converting at least one of the main image data and the sub-image data so that at least one of the parallax of the main image and the parallax of the sub-image is corrected by the amount of correction and outputting the image data, and superimposing means for superimposing the sub-image data output from the image conversion means on the main image data output from the image conversion means.

According to the embodiment of the present invention, main image data representing image data of a 3D main image and sub-image data representing image data of a 3D sub-image are read out. A parallax of each of predetermined units of a 3D main image is detected on the basis of the main image data, and main image statistical information representing statistical information regarding the parallax is generated. A parallax of each of predetermined units of a 3D sub-image is detected on the basis of the sub-image data, and sub-image statistical information representing statistical information regarding the parallax is generated. An amount of correction used for correcting at least one of the parallax of the main image and the parallax of the sub-image is computed on the basis of the main image statistical information and the sub-image statistical information so that a distance between the position of the main image and the position of the sub-image in a depth direction representing a direction perpendicular to a screen of the main image and the sub-image is within a predetermined range. At least one of the main image data and the sub-image data is converted so that at least one of the parallax of the main image and the parallax of the sub-image is corrected by the amount of correction and outputting the image data and is output. The sub-image data is superimposed on the main image data.

The image processing apparatus and the reproduction apparatus according to the embodiments of the present invention may be independent apparatuses or may be internal blocks of a single system.

According to the embodiments of the present invention, when a plurality of 3D images are combined and displayed, eye fatigue of a user can be reduced.

DESCRIPTION OF THE PREFERRED EMBODIMENTS

Embodiment
Exemplary Configuration of Image Processing Apparatus

Figure 1:
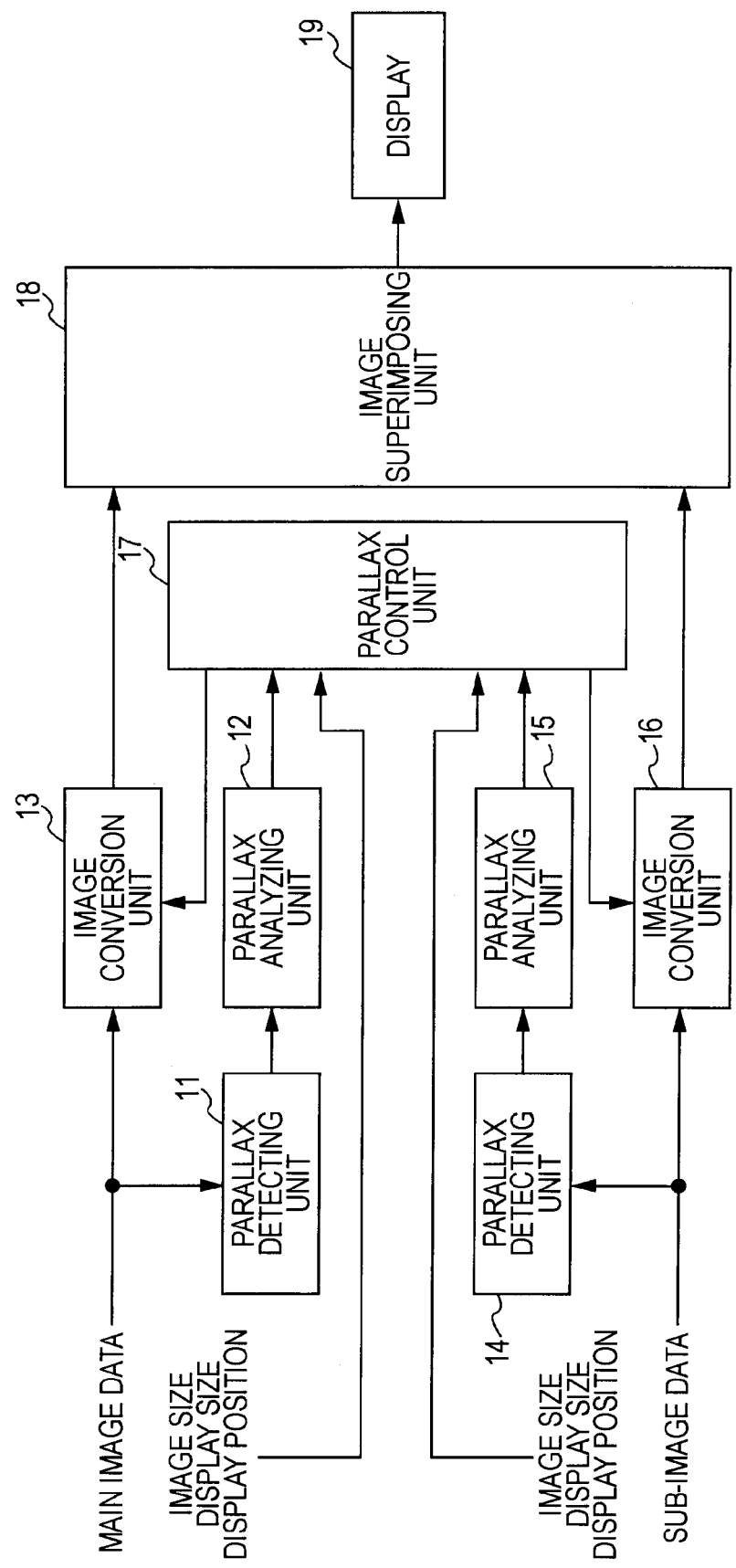
FIG. 1 is a block diagram of an exemplary configuration of an image processing apparatus according to an embodiment of the present invention.

FIG. 1 is a block diagram of an exemplary configuration of an image processing apparatus according to an embodiment of the present invention.

An image processing apparatus 10 shown in FIG. 1 includes a parallax detecting unit 11, a parallax analyzing unit 12, an image conversion unit 13, a parallax detecting unit 14, a parallax analyzing unit 15, an image conversion unit 16, a parallax control unit 17, an image superimposing unit 18, and a display 19.

The image processing apparatus 10 receives, for example, main image data and sub-image data read from a recording medium, such as a BD (Blu-ray (trade name) disc), or received from an external apparatus via, for example, a network. As used herein, the term "main image data" refers to image data of a 3D main image having a predetermined size for one screen, and the term "sub image data" refers to image data of a 3D sub-image having a predetermined size for one screen. The image processing apparatus 10 generates image data (hereinafter referred to as "display image data") so as to perform picture-in-picture display in which a 3D main image is displayed in a parent screen and a 3D sub-image is displayed in a child screen.

More specifically, the parallax detecting unit 11 (main image statistical information generating means) detects a parallax of a 3D main image for each of pixels using image data of the main image for the left eye and image data of the main image for the right eye, which constitute the main image data input from the outside. Thereafter, the parallax detecting unit 11 generates a parallax map indicating the parallax of each of the pixels of the main image. A method for generating a parallax map is described in detail in, for example, Japanese Unexamined Patent Application Publication No. 2006-114023. Note that the parallax may be detected from a block including a plurality of pixels, not from a single pixel. The parallax detecting unit 11 supplies the parallax map to the parallax analyzing unit 12.

The parallax analyzing unit 12 (the main image statistical information generating means) computes, using the parallax map supplied from the parallax detecting unit 11, a histogram serving as statistical information regarding the parallaxes of the main image. Thereafter, the parallax analyzing unit 12 supplies the histogram to the parallax control unit 17.

Using a conversion parameter supplied from the parallax control unit 17 and including an amount of shift of a display position of the main image corresponding to an amount of correction of the parallax and the display position of the main image, the image conversion unit 13 converts the main image data so that the parallax of the main image corresponding to the main image data input from the outside is corrected by the amount of correction. More specifically, the image conversion unit 13 shifts the position of the main image corresponding to the main image data for the left eye along a horizontal direction (a left-right direction) of the screen in one of the horizontal directions by the amount of shift. In addition, the image conversion unit 13 shifts the position of the main image for the right eye along a horizontal direction of the screen in the other direction by the amount of shift. In this way, the parallax of the main image is corrected.

Furthermore, the image conversion unit 13 converts the image size of the main image data having the corrected parallax into a display size using the display size of the main image included in the conversion parameter supplied from the parallax control unit 17. Thereafter, the image conversion unit 13 supplies the resultant main image data and the display position to the image superimposing unit 18.

Like the parallax detecting unit 11, the parallax detecting unit 14 (sub-image statistical information generating means) detects a parallax of a 3D sub-image for each of pixels using image data of the sub-image for the left eye and image data of the sub-image for the right eye, which constitute the sub-image data input from the outside. Thereafter, the parallax detecting unit 14 generates a parallax map for the sub-image. The parallax detecting unit 14 supplies the parallax map for the sub-image to the parallax analyzing unit 15.

Like the parallax analyzing unit 12, the parallax analyzing unit 15 (the sub-image statistical information generating means) computes a histogram serving as statistical information regarding the parallax of the sub-image using the parallax map supplied from the parallax detecting unit 14. Thereafter, the parallax analyzing unit 15 supplies the histogram to the parallax control unit 17.

Like the image conversion unit 13, using a conversion parameter supplied from the parallax control unit 17 and including an amount of shift of a display position of the sub-image corresponding to an amount of correction of the parallax and the display position of the sub-image, the image conversion unit 16 converts the sub-image data so that the parallax of the sub-image corresponding to the sub-image data input from the outside is corrected by the amount of correction.

Furthermore, the image conversion unit 16 converts the image size of the sub-image data having the corrected parallax into a display size using the display size of the sub-image included in the conversion parameter supplied from the parallax control unit 17. Thereafter, the image conversion unit 16 supplies the resultant sub-image data and the display position to the image superimposing unit 18.

The parallax control unit 17 receives the input image size, display size, and display position of the main image together with the main image data input from the outside. In addition, the parallax control unit 17 receives the input image size, display size, and display position of the sub-image together with the sub-image data input from the outside. Note that the display size of the main image corresponds to the size of the parent screen, and the display size of the sub-image corresponds to the size of the child screen used for picture-in-picture display.

Using the image size and display size of the main image, the parallax control unit 17 converts the histogram of the parallaxes of the main image supplied from the parallax analyzing unit 12 into a histogram of the parallaxes of the main image having the display size. In addition, using the image size and display size of the sub-image, the parallax control unit 17 converts the histogram of the parallaxes of the sub-image supplied from the parallax analyzing unit 15 into a histogram of the parallaxes of the sub-image having the display size. Thereafter, using the converted histogram of the parallaxes of the main image and the converted histogram of the parallaxes of the sub-image, the parallax control unit 17 computes the amounts of correction used for correcting the parallax of the main image and the parallax of the sub-image so that a distance between the position of the main image and the position of the sub-image in the depth direction is within a predetermined range. More specifically, the parallax control unit 17 computes the amounts of correction used for correcting the parallax of the main image and the parallax of the sub-image so that a distance between the converted histogram of the parallaxes of the main image and the converted histogram of the parallaxes of the sub-image is within a predetermined range.

Note that the parallax control unit 17 may compute the amounts of correction for each of screens using the histogram of the parallaxes of a main image and the histogram of the parallaxes of a sub-image for the screen. Alternatively, the parallax control unit 17 may compute the amount of correction for each of sets of screens using the average histogram of the parallaxes of a main image for the screens and the average histogram of the parallaxes of a sub-image for the screens.

The parallax control unit 17 computes an amount of shift of the display position of a main image corresponding to the amount of correction of the parallax of the main image. Thereafter, the parallax control unit 17 supplies, to the image conversion unit 13, a conversion parameter including the amount of shift, the display size of the main image, and the display position of the main image. In addition, the parallax control unit 17 computes an amount of shift of the display position of a main image corresponding to the amount of correction of the parallax of the main image. Thereafter, the parallax control unit 17 supplies, to the image conversion unit 16, a conversion parameter including the amount of shift, the display size of the sub-image, and the display position of the sub-image.

The image superimposing unit 18 superimposes the sub-image data received from the image conversion unit 16 on the main image data received from the image conversion unit 13 using the display positions received from the image conversion unit 13 and the image conversion unit 16. Thereafter, the image superimposing unit 18 outputs the resultant image data that serves as display image data to the display 19.

The display 19 is formed from a 3D display. Using the display image data supplied from the image superimposing unit 18, the display 19 displays screens for the left eye and the right eye in a time multiplexed manner. At that time, the user wears, for example, eyeglasses with shutters that are synchronized with switching between the screens for the left eye and the right eye. The user views the screen for the left eye using only the left eye and views the screen for the right eye using only the right eye. In this way, the user can view picture-in-picture display in which the 3D main image is displayed in the parent screen and the 3D sub-image is displayed in the child screen.

Examples of Parallax Map and Histogram of Parallaxes of Main Image

Figure 2A:
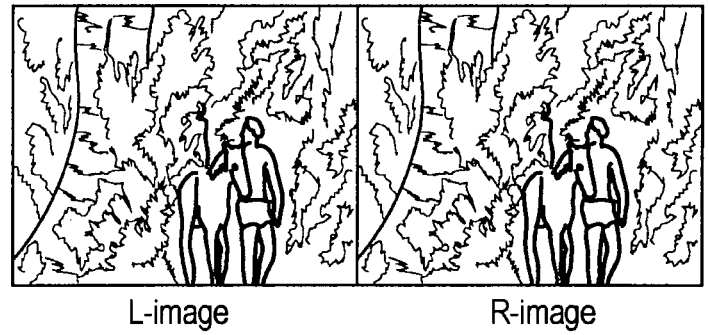
FIGS. 2A to 2C illustrate examples of a parallax map and a parallax histogram of a main image.
Figure 2B:
Figure 2C:
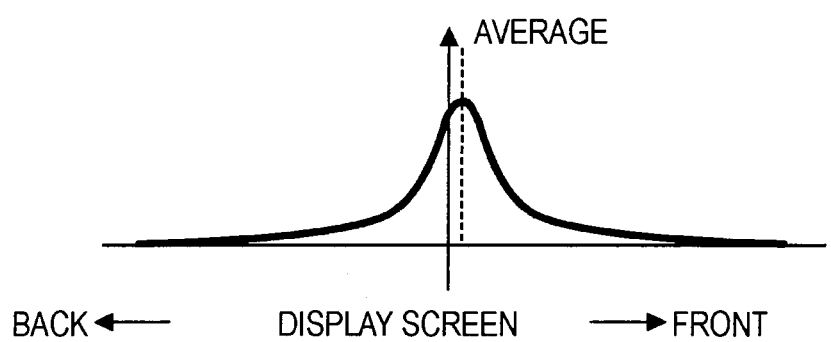

FIGS. 2A to 2C illustrate examples of a parallax map and a histogram of the parallaxes of a main image corresponding to input main image data.

A main image for the left eye corresponding to the input main image data is shown on the left-hand side of FIG. 2A, and a main image for the right eye is shown on the right-hand side of FIG. 2A.

A parallax map shown in FIG. 2B is generated on the basis of the image data of the main image for the left eye and the image data of the main image for the right eye shown in FIG. 2A. Note that, in the parallax map shown in FIG. 2B, as the density of color increases, the parallax decreases. That is, as the density of color of a point increases, the point is further away from the user in the depth direction. In addition, the parallax map shown in FIG. 2B is a parallax map of the parallax detected on the basis of the image data of the main image for the left eye. However, a parallax map of the parallax detected on the basis of the image data of the main image for the right eye may be generated. Alternatively, two types of parallax map may be generated on the basis of image data of the main images for the left and right eyes. This generation method is also applied to FIGS. 3B and 4B illustrated below.

In addition, as shown in FIG. 2C, a histogram of the parallaxes of the main image for one screen is generated on the basis of the parallax map shown in FIG. 2B. In the histogram shown in FIG. 2C, the abscissa represents a point in the depth direction, and the ordinate represents the degree of the parallax corresponding to the point. Note that this representation is also applied to FIGS. 3C, 5A, and 5B and FIGS. 6 to 8 illustrated below. In the example shown in FIG. 2C, the point in the depth direction corresponding to the average of the parallaxes is positioned at a front side slightly in front of the display screen.

Examples of Parallax Map and Histogram of Parallax of Sub-Image

Figure 3A:
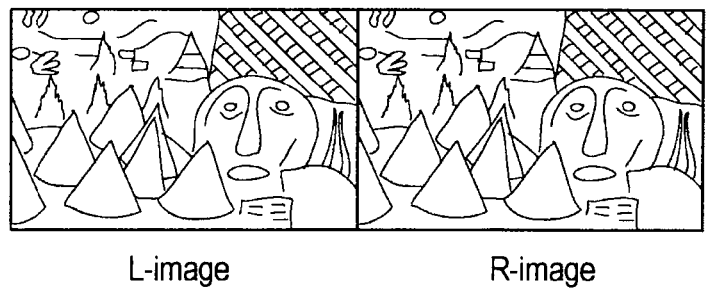
FIGS. 3A to 3C illustrate examples of a parallax map of a sub-image and a histogram of the parallaxes.
Figure 3B:
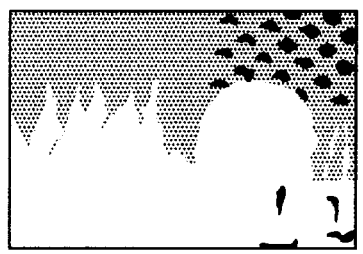
Figure 3C:
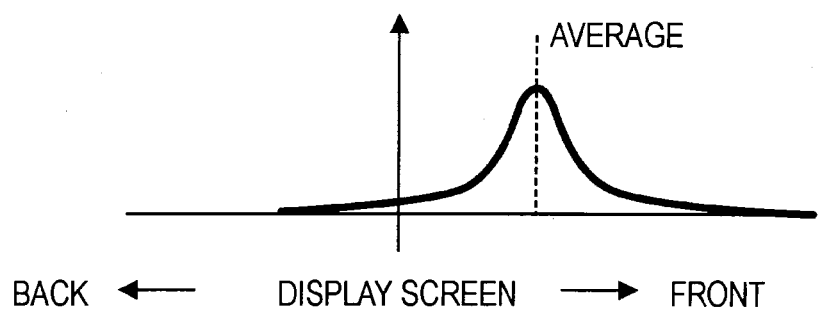

FIGS. 3A to 3C illustrate examples of a parallax map and a histogram of the parallaxes of a sub-image corresponding to input sub-image data.

A sub-image for the left eye corresponding to the input sub-image data is shown on the left-hand side of FIG. 3A, and a sub-image for the right eye is shown on the left-hand side of FIG. 3A. A parallax map shown in FIG. 3B is generated on the basis of the image data of the sub-image for the left eye and the image data of the sub-image for the left eye shown in FIG. 3A.

In addition, as shown in FIG. 3C, a histogram of the parallaxes of the sub-image for one screen is generated on the basis of the parallax map shown in FIG. 3B. In the example shown in FIG. 3C, the point in the depth direction corresponding to the average of the parallaxes is positioned at a distance further from the surface of the display than that shown in FIG. 2C is.

Description of Conversion of Histogram of Parallaxes of Sub-Image

FIGS. 4A and 4B and FIGS. 5A and 5B illustrate conversion of a histogram of the parallaxes of a sub-image.

Figure 4A:
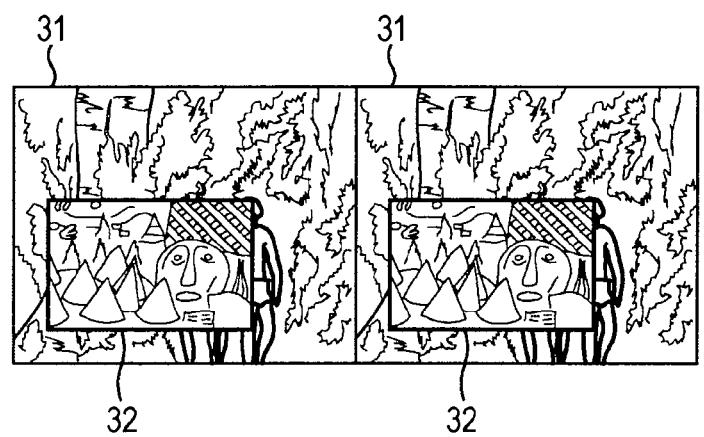
FIGS. 4A and 4B illustrate examples of a parallax map of a main image having the display size.
Figure 4B:
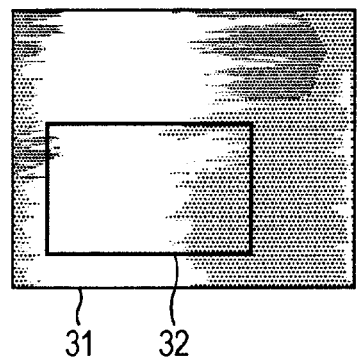

Here, as shown in FIG. 4A, a main image for the left eye shown in the left-hand side of FIG. 2A is displayed in a parent screen 31 for the left eye having the same size as the image size of the main image data, and a sub-image for the left eye shown in the left-hand side of FIG. 3A is displayed in a child screen 32 for the left eye having the size different from the image size of the sub-image data. In addition, a main image for the right eye shown in the right-hand side of FIG. 2A is displayed in the parent screen 31 for the right eye, and a sub-image for the right eye shown in the right-hand side of FIG. 3A is displayed in the child screen 32 for the right eye.

In this case, since the size of the parent screen 31 is the same as the image size of the main image data, the parallax map of the main image having the display size is the same as the parallax map shown in FIG. 2B, as shown in FIG. 4B. Accordingly, the histogram of the parallaxes of the main image having the display size is that shown in FIG. 2C.

Figure 5A:
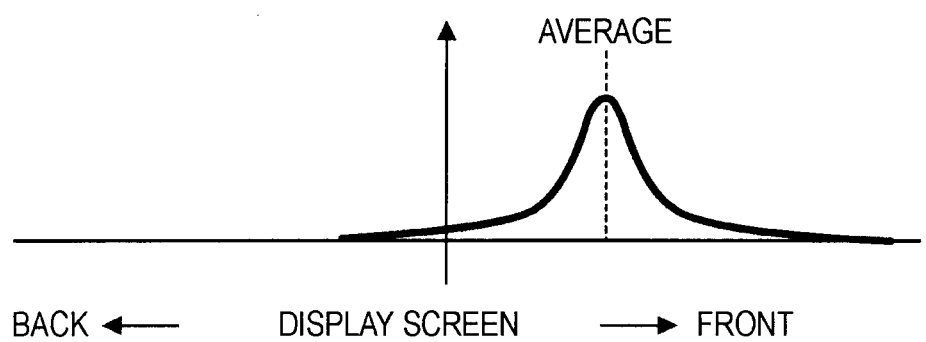
FIGS. 5A and 5B illustrate examples of histograms of the parallax of a sub-image having the image size and a sub-image having the display size.

In contrast, the size of the child screen 32 is not the same as the image size of the sub-image data. Accordingly, a histogram of the parallaxes of the sub-image shown in FIG. 5A is converted into a histogram of the parallaxes of the sub-image having the size of the child screen 32 shown in FIG. 5B, that is, the display size. More specifically, the histogram shown in FIG. 5A is enlarged or reduced by the ratio of the display size in the horizontal direction to the image size of the sub-image in the horizontal direction. Thus, as shown in FIG. 5B, the histogram of the parallaxes of the sub-image having the display size is generated.

Figure 5B:
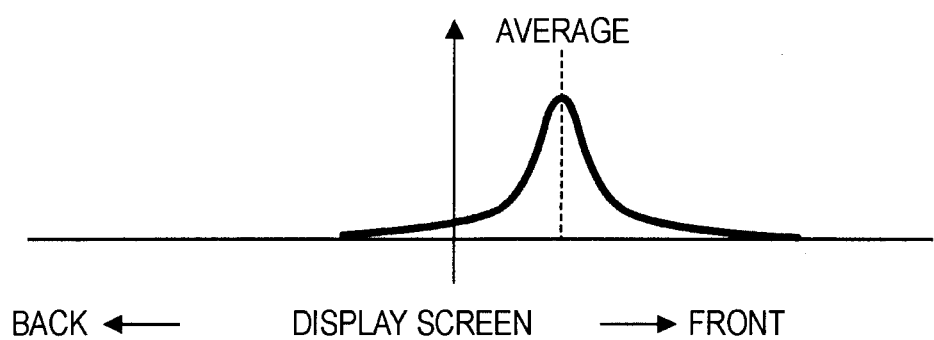

For example, when the ratio of the display size in the horizontal direction to the image size of the sub-image in the horizontal direction is 1/2, the histogram of the parallaxes of the sub-image having the display size is obtained by reducing the histogram shown in FIG. 5B by 1/2 in the horizontal direction.

Note that, in the description of FIGS. 4A and 4B and FIGS. 5A and 5B, the size of the parent screen 31 is the same as the image size of the main image. Accordingly, the histogram of the parallaxes of the main image is not converted. However, if the size of the parent screen 31 differs from the image size of the main image, the histogram of the parallaxes of the main image is converted, like the histogram of the parallaxes of the sub-image.

Description of Amount of Correction

Figure 6:
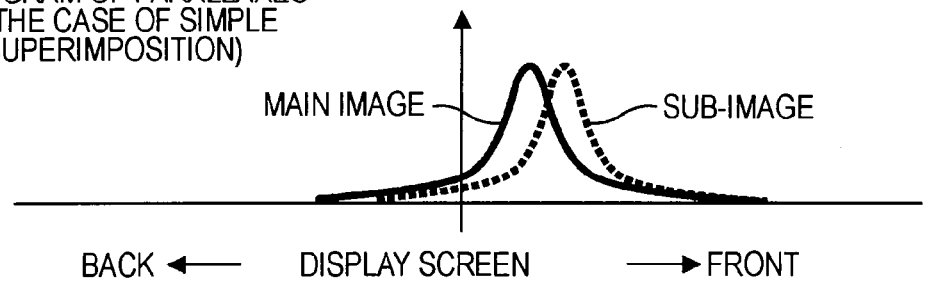
FIG. 6 is a diagram illustrating examples of a histogram of the parallaxes of display image data when the parallax is not corrected.
Figure 7:
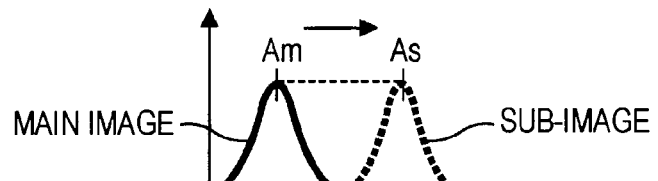
FIG. 7 is a diagram illustrating examples of a histogram of the parallaxes of display image data when the parallax is corrected.
Figure 8:
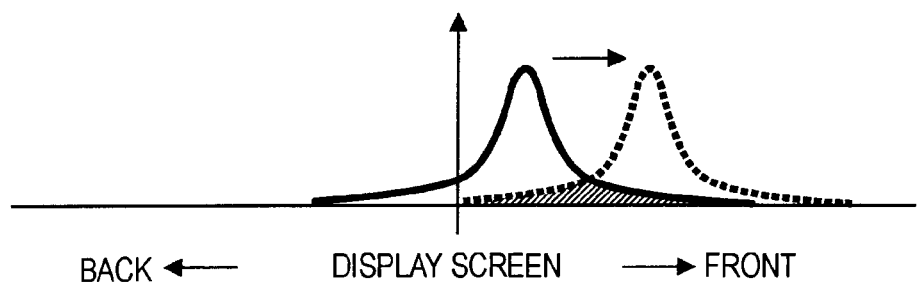
FIG. 8 is a diagram illustrating other examples of a histogram of the parallaxes of display image data when the parallax is corrected.

FIGS. 6 to 8 are diagrams illustrating the amount of correction.

FIG. 6 illustrates a histogram of the parallaxes of display image data obtained when a main image for the left eye shown in the left-hand side of FIG. 2A is displayed in the parent screen 31 for the left eye, a sub-image for the left eye shown in the left-hand side of FIG. 3A is displayed in the child screen 32 for the left eye, a main image for the right eye shown in the right-hand side of FIG. 2A is displayed in the parent screen 31 for the right eye, and a sub-image for the right eye shown in the right-hand side of FIG. 3A is displayed in the child screen 32 for the right eye.

The histogram of the parallaxes of the display image data shown in FIG. 6 is obtained by combining the histogram of the parallaxes of the main image having the display size shown in FIG. 2B with the histogram of the parallaxes of the sub-image having the display size shown in FIG. 5B.

When the histogram of the parallaxes of the display image data is that shown in FIG. 6, the distance between the histogram of the parallaxes of the main image and the histogram of the parallaxes of the sub-image is small. That is, the distance between the position of the main image displayed in the parent screen 31 and the position of the sub-image displayed in the child screen 32 in the depth direction is small. As a result, eye fatigue of the user occurs. In addition, although not shown, even when the distance between the position of the main image displayed in the parent screen 31 and the position of the sub-image displayed in the child screen 32 in the depth direction is large, eye fatigue of the user occurs.

Accordingly, the parallax control unit 17 computes the amount of correction of parallax for each of the main image and the sub-image so that the distance between the histogram of the parallaxes of the main image having the display size and the histogram of the parallaxes of the sub-image having the display size is within a predetermined range.

More specifically, as shown in FIG. 7, the parallax control unit 17 computes the amount of correction of parallax for each of the main image and the sub-image so that the distance between an average Am of the parallaxes of the main image having the display size and an average As of the parallaxes of the sub-image having the display size is within a predetermined range. Note that, in this description, the amount of correction of parallax for each of the main image and the sub-image is computed so that the distance between the average Am and the average As is within a predetermined range. However, the amount of correction of parallax for each of the main image and the sub-image may be computed so that the maximum value of the parallaxes of the main image and the minimum value of the parallaxes of the sub-image is within a predetermined range.

Alternatively, as shown in FIG. 8, the parallax control unit 17 may compute the amount of correction of parallax for each of the main image and the sub-image so that the ratio of the area in which the histogram of the parallaxes of the sub-image having the display size overlaps with the histogram of the parallaxes of the main image having the display size (see the diagonally-lined area in FIG. 8) to the entire area of the histogram of the parallaxes of the main image is within a predetermined range (e.g., 10% or higher and 90% or lower). Still alternatively, the parallax control unit 17 may compute the amount of correction of parallax for each of the main image and the sub-image so that the difference between the following two parallaxes is within a predetermined range: the parallax corresponding to the back end of an area that is a predetermined percent (e.g., 3%) of the entire area and that starts from the parallax corresponding to the front end and ends at a predetermined parallax in the depth direction in the histogram of the parallaxes of the main image having the display size and the parallax of the front end of an area that is a predetermined percent (e.g., 3%) of the entire area and that starts from a predetermined parallax and ends at the parallax corresponding the back end in the depth direction in the histogram of the parallaxes of the sub-image having the display size. In addition, the above-described methods for computing the amount of correction of parallax may be combined. Yet still alternatively, the amount of correction of parallax for each of the main image and the sub-image can be computed using the parallax of a major object in the main image and the parallax of a major object in the sub-image.

In addition, in the examples shown in FIGS. 7 and 8, only the histogram of the parallaxes of the sub-image having the display size is moved. However, only the histogram of the parallaxes of the main image having the display size may be moved. Alternatively, both the histogram of the parallaxes of the sub-image having the display size and the histogram of the parallaxes of the main image having the display size may be moved.

However, it is desirable that the amount of correction of parallax for each of the main image and the sub-image be computed so that the display position of the main image having a corrected parallax in the depth direction and the display position of the sub-image having a corrected parallax in the depth direction are located within the range for which the user can comfortably view the 3D images.

Figure 9:
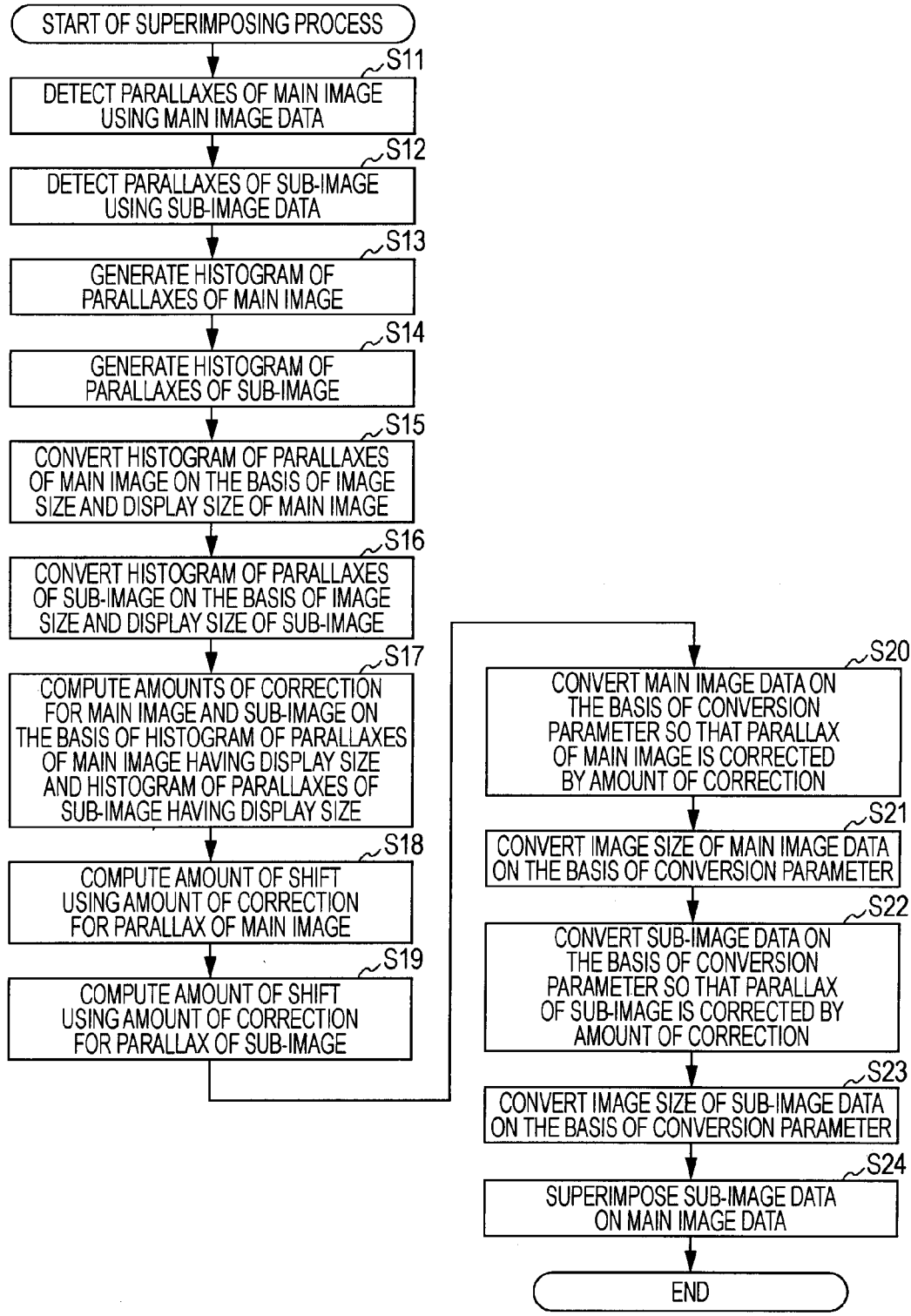
FIG. 9 is a flowchart of a superimposing process performed by the image processing apparatus shown in FIG. 1.

In addition, if the amount of correction of parallax for each of the main image and the sub-image is computed so that the display position of the sub-image in the depth direction is located on the front side (a user side) from the display position of the main image in the depth direction, the user can view the picture-in-picture display without any unpleasant sensation.
Description of Processing Performed by Image Processing Apparatus FIG. 9 is a flowchart of an exemplary superimposing process performed by the image processing apparatus 10 shown in FIG. 1. The superimposing process starts when, for example, the main image data and sub-image data are input to the image processing apparatus 10.

In step S11, the parallax detecting unit 11 detects a parallax of a 3D main image for each of pixels using image data of the main image for the left eye and image data of the main image for the right eye, which constitute the main image data input from the outside. Thus, the parallax detecting unit 11 generates a parallax map. Thereafter, the parallax detecting unit 11 supplies the parallax map to the parallax analyzing unit 12. Note that instead of detecting the parallaxes of the entire area of the 3D main image, the parallax detecting unit 11 may detect the parallaxes of only an area of the 3D main image in which the sub-image is superimposed. Alternatively, the parallax detecting unit 11 may detect the parallaxes of an area of the 3D main image in which the sub-image is superimposed and the parallaxes of an area around the area. In such a case, as compared with the case in which the parallaxes of the entire area of the 3D main image are detected, the amount of computation for detecting the parallaxes can be reduced.

In step S12, the parallax detecting unit 14 detects a parallax of a 3D sub-image for each of pixels using image data of the sub-image for the left eye and image data of the sub-image for the right eye, which constitute the sub-image data input from the outside. Thus, the parallax detecting unit 14 generates a parallax map. The parallax detecting unit 14 supplies the parallax map to the parallax analyzing unit 15.

In step S13, the parallax analyzing unit 12 generates a histogram regarding the parallaxes of the main image using the parallax map supplied from the parallax detecting unit 11. Thereafter, the parallax analyzing unit 12 supplies the histogram to the parallax control unit 17. Note that when the parallax detecting unit 11 detects the parallax of only an area of the main image in which the sub-image is superimposed or the parallax of an area of the main image in which the sub-image is superimposed and an area around the area, the parallax analyzing unit 12 generates the histogram of the parallaxes of the partial area of the main image for which the parallax is detected and supplies the histogram to the parallax control unit 17.

In step S14, the parallax analyzing unit 15 generates a histogram regarding the parallax of the sub-image using the parallax map supplied from the parallax detecting unit 14 and supplies the generated histogram to the parallax control unit 17.

In step S15, using the image size and display size of the main image together with the main image data input from the outside, the parallax control unit 17 converts the histogram of the parallaxes of the main image supplied from the parallax analyzing unit 12 into a histogram of the parallaxes of the main image having the display size.

In step S16, using the image size and display size of the sub-image together with the sub-image data input from the outside, the parallax control unit 17 converts the histogram of the parallaxes of the sub-image supplied from the parallax analyzing unit 15 into a histogram of the parallaxes of the sub-image having the display size.

In step S17, using the histogram of the parallaxes of the main image having the display size and the histogram of the parallaxes of the sub-image having the display size, the parallax control unit 17 computes the amounts of correction used for correcting the parallax of the main image and the parallax of the sub-image so that a distance between the histogram of the parallaxes of the sub-image having the display size and the histogram of the parallaxes of the main image having the display size is within a predetermined range.

In step S18, the parallax control unit 17 computes an amount of shift of the display position of the main image on the basis of the amount of correction of the parallax of the main image computed in step S17. Thereafter, the parallax control unit 17 supplies, to the image conversion unit 13, a conversion parameter including the amount of shift, the display size of the main image, and the display position of the main image.

In step S19, the parallax control unit 17 computes an amount of shift of the display position of the sub-image using the amount of correction of the parallax of the sub-image computed in step S17. Thereafter, the parallax control unit 17 supplies, to the image conversion unit 16, a conversion parameter including the amount of shift, the display size of the sub-image, and the display position of the sub-image.

In step S20, using the amount of shift of the display position of the main image corresponding to the amount of correction of the parallax included in the conversion parameter supplied from the parallax control unit 17 and the display position of the main image, the image conversion unit 13 converts the main image data so that the parallax of the main image corresponding to the main image data input from the outside is corrected by the amount of correction.

In step S21, the image conversion unit 13 converts the image size of the main image data converted in step S20 into a display size using the display size of the main image included in the conversion parameter supplied from the parallax control unit 17. Thereafter, the image conversion unit 13 supplies the resultant main image data and the display position to the image superimposing unit 18.

In step S22, using the amount of shift of a display position of the sub-image corresponding to an amount of correction of the parallax included in the conversion parameter supplied from the parallax control unit 17 and the display position of the sub-image, the image conversion unit 16 converts the sub-image data so that the parallax of the sub-image corresponding to the sub-image data input from the outside is corrected by the amount of correction.

In step S23, the image conversion unit 16 converts the image size of the sub-image data converted in step S22 into a display size using the display size of the sub-image included in the conversion parameter supplied from the parallax control unit 17. Thereafter, the image conversion unit 16 supplies the resultant sub-image data and the display position to the image superimposing unit 18.

In step S24, the image superimposing unit 18 superimposes the sub-image data received from the image conversion unit 16 on the main image data received from the image conversion unit 13 using the display positions received from the image conversion unit 13 and the image conversion unit 16. Thereafter, the image superimposing unit 18 outputs the resultant image data that serves as display image data to the display 19. Thus, the processing is completed.

As described above, the image processing apparatus 10 computes an amount of correction used for correcting at least one of the parallax of the main image and the parallax of the sub-image so that the distance between the histogram of the parallaxes of the main image and the histogram of the parallaxes of the sub-image is within a predetermined range. Thereafter, the image processing apparatus 10 converts at least one of the main image data and the sub-image data so that at least one of the parallax of the main image and the parallax of the sub-image is corrected. Accordingly, the position of the main image in the depth direction is not too far away from or too close to the position of the sub-image in the depth direction. Consequently, eye fatigue of the user can be reduced.

While the description has been made with reference to the image processing apparatus 10 that computes the parallax map, the parallax map may be input from the outside together with the main image data and the sub-image data.

In addition, the image data of the sub-image for the left eye and the image data of the sub-image for the right eye that constitute the sub-image data may be image data obtained by shifting the display position of 2D sub-image data by a predetermined amount of offset in opposite horizontal directions or may be image data of two sub-image obtained from different points of view.

Description of Computer According to Embodiment

The above-described series of processes can be executed not only by hardware but also by software. When the above-described series of processes are executed by software, the programs of the software are installed in, for example, a general-purpose computer.

Figure 10:
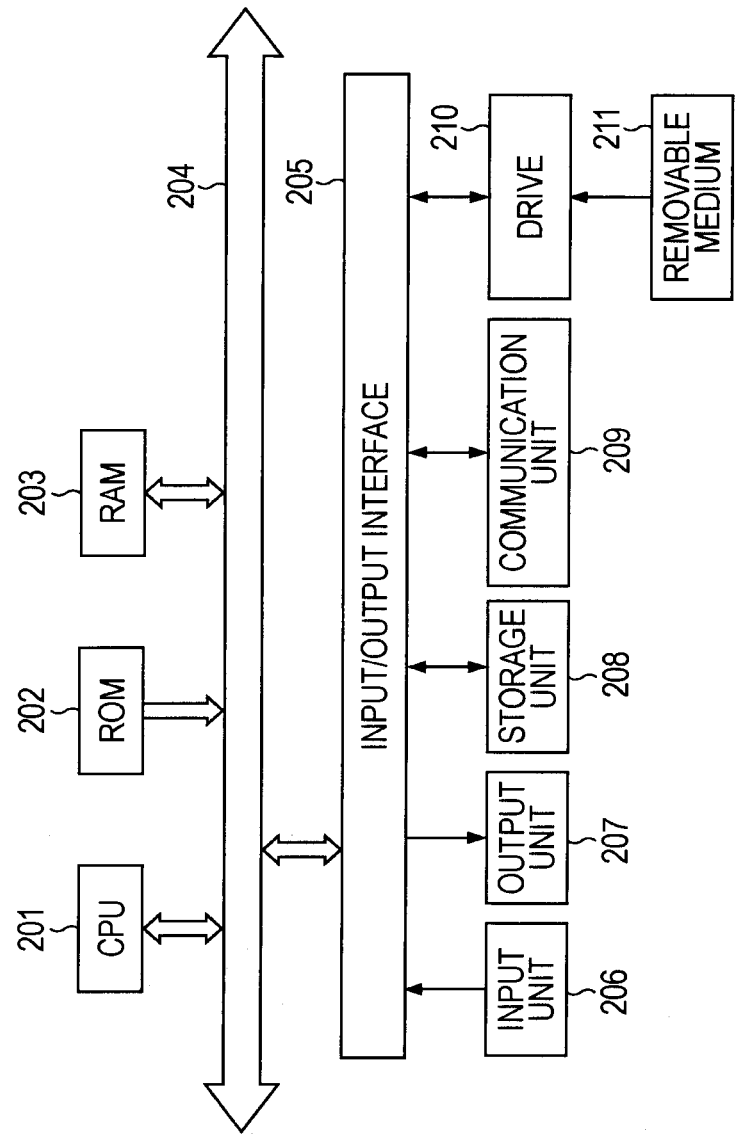
FIG. 10 illustrates an exemplary configuration of a computer according to an embodiment.

FIG. 10 illustrates an exemplary configuration of a computer having a program that performs the above-described series of processes installed therein, according to an embodiment.

The program can be prerecorded in a storage unit 208 and a ROM (Read Only Memory) 202 which are recording media incorporated into the computer.

Alternatively, the program can be stored (recorded) in a removable medium 211. The removable medium 211 can be provided in the form of so-called package software. Examples of the removable medium 211 include a flexible disk, a CD-ROM (compact disc-read only memory), an MO (magnetooptical) disc, a DVD (digital versatile disc), a magnetic disc, and a semiconductor memory.

Note that the programs can be installed in a computer from the removable medium 211 via a drive 210. In addition, the programs can be downloaded into a computer via a communication network or a broadcast network and can be installed in the storage unit 208 incorporated into the computer. That is, the programs can be wirelessly transferred from, for example, a download site into the computer via an artificial satellite for digital satellite broadcasting. Alternatively, the programs can be transferred from a download site into the computer through wired communication using a network, such as a LAN (Local Area Network) or the Internet.

The computer incorporates a central processing unit (CPU) 201. An input/output interface 205 is connected to the CPU 201 via a bus 204.

Upon receiving a command, via the input/output interface 205, from a user who operates an input unit 206, the CPU 201 executes the program stored in the ROM 202. Alternatively, the CPU 201 loads the program stored in the storage unit 208 into a random access memory (RAM) 203 and executes the program.

In this way, the CPU 201 performs the process in accordance with the above-described flowchart or the process to be performed by the configuration illustrated in the above-described block diagram. Thereafter, the CPU 201 outputs the result of the process using, for example, an output unit 207 via the input/output interface 205 or transmits the result using a communication unit 209 if necessary. In addition, the CPU 201 records the result in the storage unit 208.

Note that the input unit 206 includes a keyboard, a mouse, and a microphone. In addition, the output unit 207 includes a liquid crystal display (LCD) and a speaker.

In the present specification, the processes to be performed by the computer are not necessarily performed in accordance with the time sequence described in the flowchart. That is, the processes performed by the computer in accordance with a program include a process performed in parallel with another process or a process performed independently (e.g., a parallel process or a process using an object).

In addition, the program may be executed by a single computer (a single processor) or a plurality of computers in a distributed processing manner. Alternatively, the program may be transferred to a remote computer and may be executed by the remote computer.

It should be noted that the present invention is not limited to an image processing apparatus that performs picture-in-picture display in which a main image is displayed in a parent screen and a sub-image is displayed in a child screen. The present invention is applicable to any image processing apparatus that combines a plurality of 3D images and displays the combined 3D image. For example, the present invention is applicable to an image processing apparatus that generates an OSD image by combining a 3D sub-image with a 3D main image and displays the OSD image, an image processing apparatus that combines a 3D sub-image serving as a caption image with a 3D main image and displays the combined image, or an image processing apparatus that performs picture-in-picture display, OSD display, or caption display by combining a plurality of sub-images with a main image.

Figure 11:
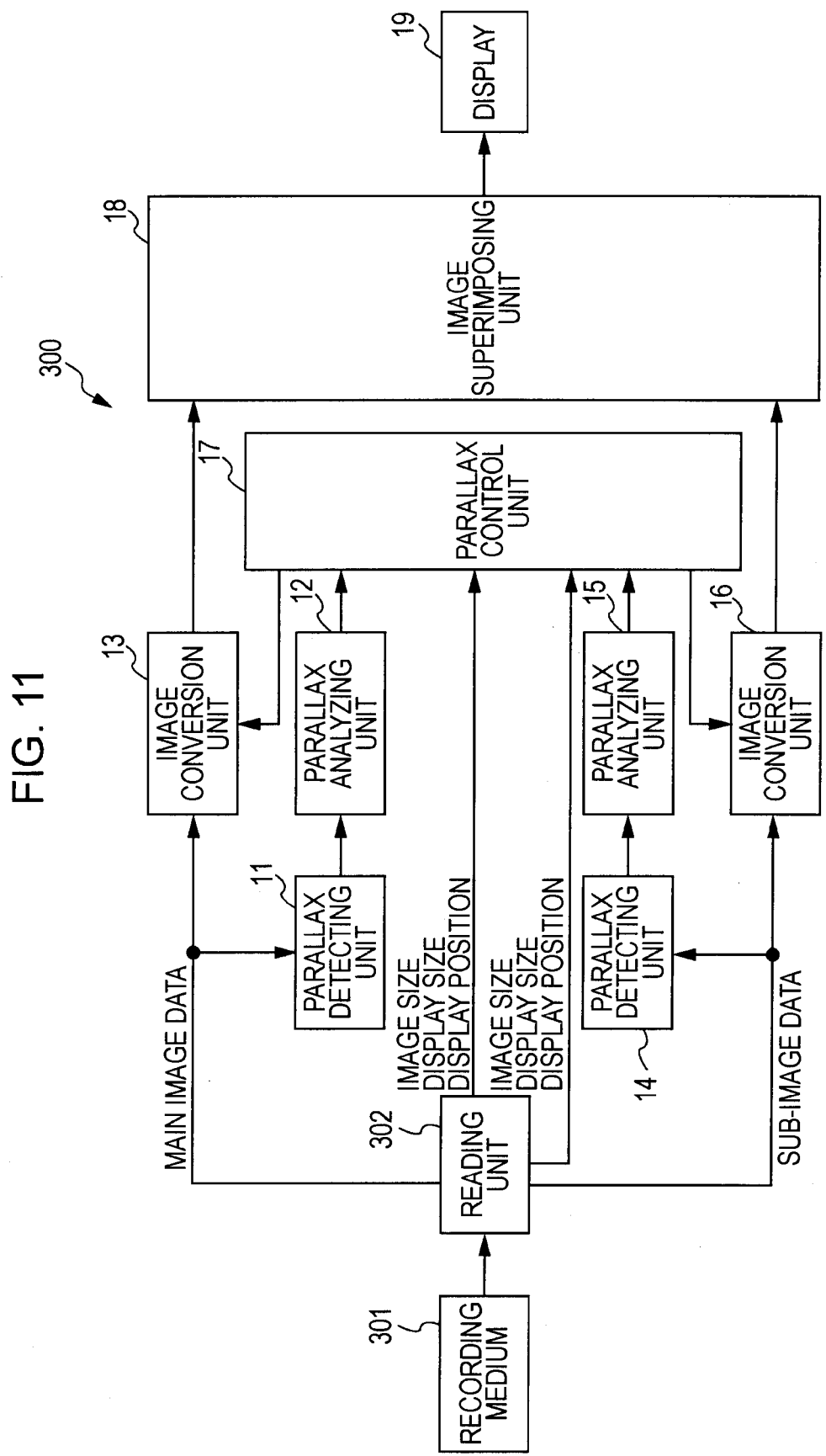
FIG. 11 is a block diagram of an exemplary configuration of a reproduction apparatus according to an embodiment of the present invention.

Furthermore, the present invention is applicable to a reproduction apparatus having a function of reading main image data and sub-image data from a recording medium. In this case, for example, as shown in FIG. 11, a reproduction apparatus 300 includes the component disposed in the image processing apparatus 10 and a reading unit 302 that reads main image data and sub-image data stored in a recording medium 301.

Still furthermore, while the above description has been made with reference to the case in which a single sub-image is superimposed on a main image, a plurality of sub-images may be superimposed. In such a case, the above-described superimposing process is repeatedly performed.

An embodiment of the present invention is not limited to the above-described embodiment, but various modifications can be made without departing from the spirit of the present invention.

What is claimed is:

1. An image processing apparatus comprising:
    main image statistical information generating means for detecting a parallax of each of predetermined units of a 3D main image on the basis of main image data representing image data of the main image and generating main image statistical information representing statistical information regarding the parallax;
    sub-image statistical information generating means for detecting a parallax of each of predetermined units of a 3D sub-image on the basis of sub-image data representing image data of the sub-image and generating sub-image statistical information representing statistical information regarding the parallax;
    parallax control means for computing, on the basis of the main image statistical information and the sub-image statistical information, an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range;
    image conversion means for converting at least one of the main image data and the sub-image data so that at least one of the parallax of the main image and the parallax of the sub-image is corrected by the amount of correction and outputting the image data; and
    superimposing means for superimposing the sub-image data output from the image conversion means on the main image data output from the image conversion means.

2. The image processing apparatus according to claim 1, wherein the parallax control means computes the amount of correction so that a difference between an average of the parallaxes of the main image and an average of the parallaxes of the sub-image is within a predetermined range.

3. The image processing apparatus according to claim 1, wherein the statistical information is in the form of a histogram, and wherein the parallax control means computes the amount of correction so that a ratio of an area of the histogram of the main statistical information that overlaps with the sub-image statistical information to the entire area of the histogram of the main statistical information is within a predetermined range.

4. The image processing apparatus according to claim 1, wherein the parallax control means computes the amount of correction so that a distance between the position of the main image and the position of the sub-image in the depth direction is within a predetermined range and the position of the sub-image in the depth direction is located so as to be closer to a user than the position of the main image in the depth direction.

5. The image processing apparatus according to claim 1, wherein,
    when an image size of the main image data differs from a display size of the main image data, the parallax control means further converts the main image statistical information into main image statistical information for the display size of the main image data on the basis of the image size of the main image data and the display size of the main image data, and
    wherein, when an image size of the sub-image data differs from a display size of the sub-image data, the parallax control means further converts the sub-image statistical information into sub-image statistical information for the display size of the sub-image data on the basis of the image size of the sub-image data and the display size of the sub-image data, and
    wherein the parallax control means computes the amount of correction on the basis of the main image statistical information and the sub-image statistical information after the conversion.

6. An image processing method for use in an image processing apparatus, comprising the steps of:
    detecting a parallax of each of predetermined units of a 3D main image on the basis of main image data representing image data of the main image and generating main image statistical information representing statistical information regarding the parallax;
    detecting a parallax of each of predetermined units of a 3D sub-image on the basis of sub-image data representing image data of the sub-image and generating sub-image statistical information representing statistical information regarding the parallax;
    computing an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range on the basis of the main image statistical information and the sub-image statistical information;
    converting at least one of the main image data and the sub-image data so that at least one of the parallax of the main image and the parallax of the sub-image is corrected by the amount of correction and outputting the image data; and
    superimposing the output sub-image data on the output main image data.

7. A non-transitory, computer-readable storage medium storing a program that, when executed by a computer, causes the computer to perform a method, the method comprising:
    detecting a parallax of each of predetermined units of a 3D main image on the basis of main image data representing image data of the main image and generating main image statistical information representing statistical information regarding the parallax,
    detecting a parallax of each of predetermined units of a 3D sub-image on the basis of sub-image data representing image data of the sub-image and generating sub-image statistical information representing statistical information regarding the parallax, computing an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range on the basis of the main image statistical information and the sub-image statistical information, converting at least one of the main image data and the sub-image data so that at least one of the parallax of the main image and the parallax of the sub-image is corrected by the amount of correction and outputting the image data, and superimposing the output sub-image data on the output main image data.

8. A reproduction apparatus comprising:

read-out means for reading out main image data representing image data of a 3D main image and sub-image data representing image data of a 3D sub-image;

main image statistical information generating means for detecting a parallax of each of predetermined units of the main image on the basis of the main image data and generating main image statistical information representing statistical information regarding the parallax;

sub-image statistical information generating means for detecting a parallax of each of predetermined units of the sub-image on the basis of the sub-image data and generating sub-image statistical information representing statistical information regarding the parallax;

parallax control means for computing an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range on the basis of the main image statistical information and the sub-image statistical information;

image conversion means for converting at least one of the main image data and the sub-image data so that at least one of the parallax of the main image and the parallax of the sub-image is corrected by the amount of correction and outputting the image data; and superimposing means for superimposing the sub-image data output from the image conversion means on the main image data output from the image conversion means.

9. An image processing apparatus comprising:

a main image statistical information generating unit configured to detect a parallax of each of predetermined units of a 3D main image on the basis of main image data representing image data of the main image and generate main image statistical information representing statistical information regarding the parallax;

a sub-image statistical information generating unit configured to detect a parallax of each of predetermined units of a 3D sub-image on the basis of sub-image data representing image data of the sub-image and generate sub-image statistical information representing statistical information regarding the parallax;

a parallax control unit configured to compute, on the basis of the main image statistical information and the sub-image statistical information, an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range;

an image conversion unit configured to convert at least one of the main image data and the sub-image data so that at least one of the parallax of the main image and the parallax of the sub-image is corrected by the amount of correction and output the image data; and a superimposing unit configured to superimpose the sub-image data output from the image conversion unit on the main image data output from the image conversion unit.

10. A reproduction apparatus comprising:

a read-out unit configured to read out main image data representing image data of a 3D main image and sub-image data representing image data of a 3D sub-image;

a main image statistical information generating unit configured to detect a parallax of each of predetermined units of the main image on the basis of the main image data and generate main image statistical information representing statistical information regarding the parallax;

a sub-image statistical information generating unit configured to detect a parallax of each of predetermined units of the sub-image on the basis of the sub-image data and generating sub-image statistical information representing statistical information regarding the parallax;

a parallax control unit configured to compute an amount of correction used for correcting at least one of the parallax of the main image and the parallax of the sub-image so that a distance between the position of the main image and the position of the sub-image in a depth direction representing a direction perpendicular to a screen of the main image and the sub-image is within a predetermined range on the basis of the main image statistical information and the sub-image statistical information;

an image conversion unit configured to convert at least one of the main image data and the sub-image data so that at least one of the parallax of the main image and the parallax of the sub-image is corrected by the amount of correction and output the image data; and a superimposing unit configured to superimpose the sub-image data output from the image conversion unit on the main image data output from the image conversion unit.

* * * * *